Jan. 3, 1939.  J. SCHMELLER, SR  2,142,875
METHOD OF HANDLING AND TREATING METAL
Original Filed Aug. 31, 1932   3 Sheets-Sheet 1

Inventor
John Schmeller, Sr.,
By Saywell & Wesseler,
Attorneys

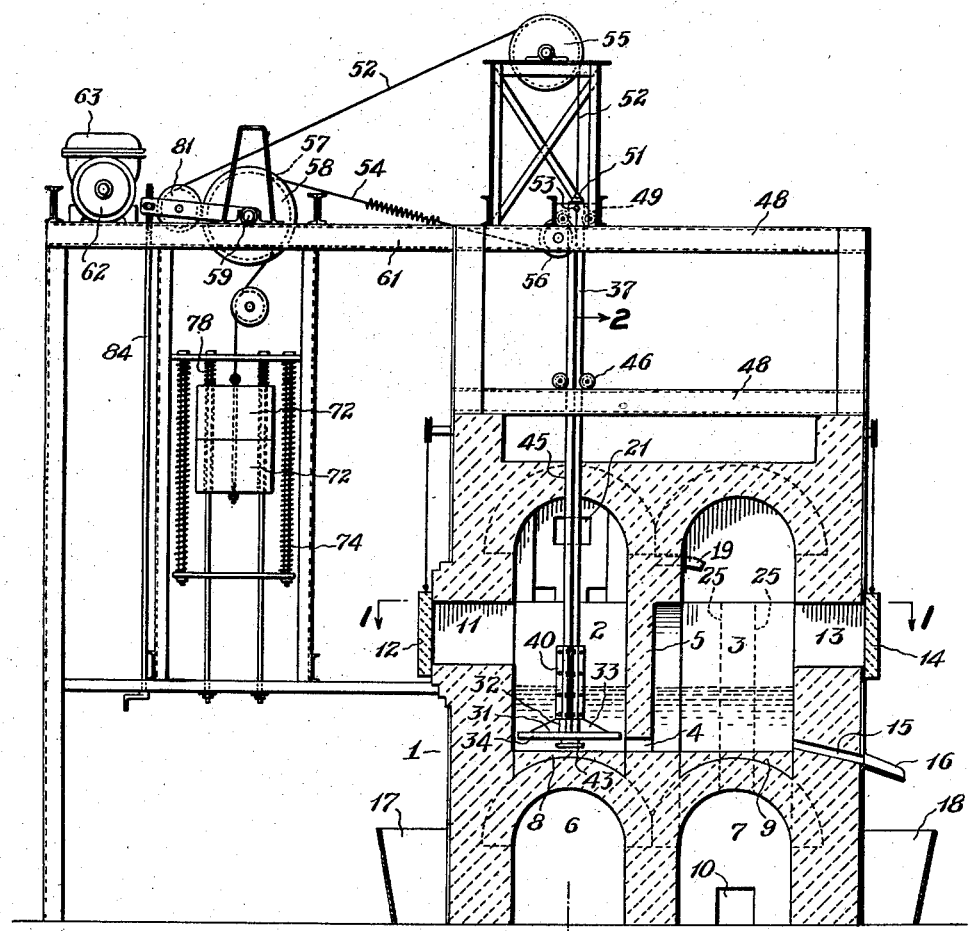
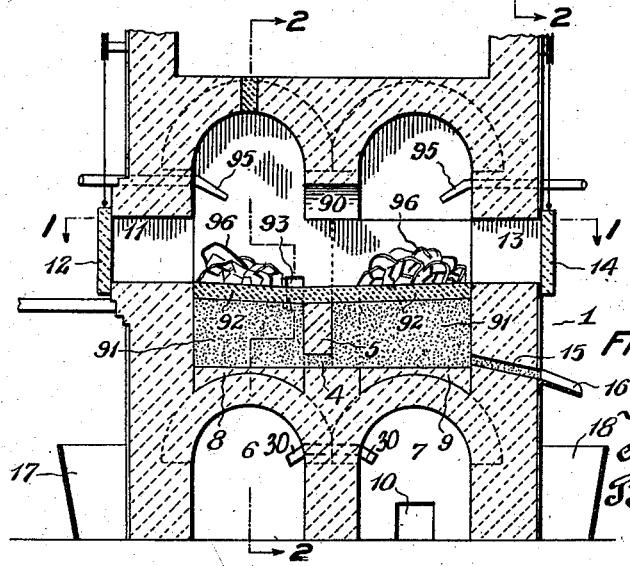
Fig. 3.
Fig. 4.

Jan. 3, 1939. J. SCHMELLER, SR 2,142,875
METHOD OF HANDLING AND TREATING METAL
Original Filed Aug. 31, 1932   3 Sheets-Sheet 3
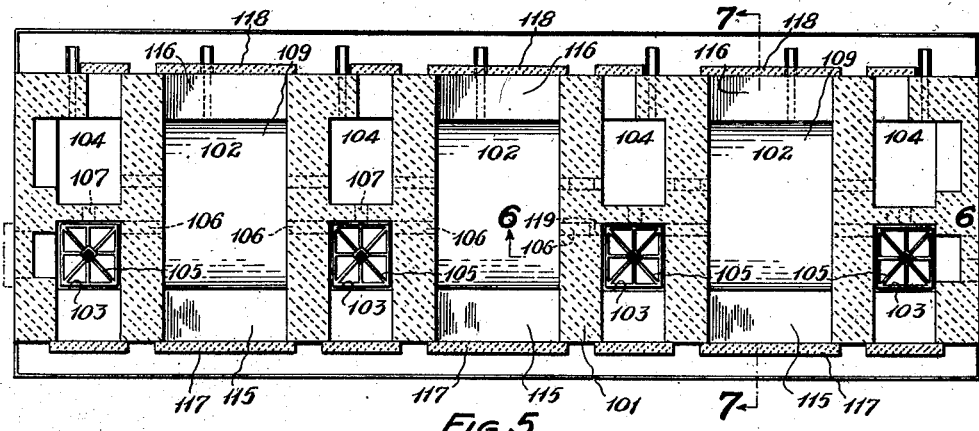
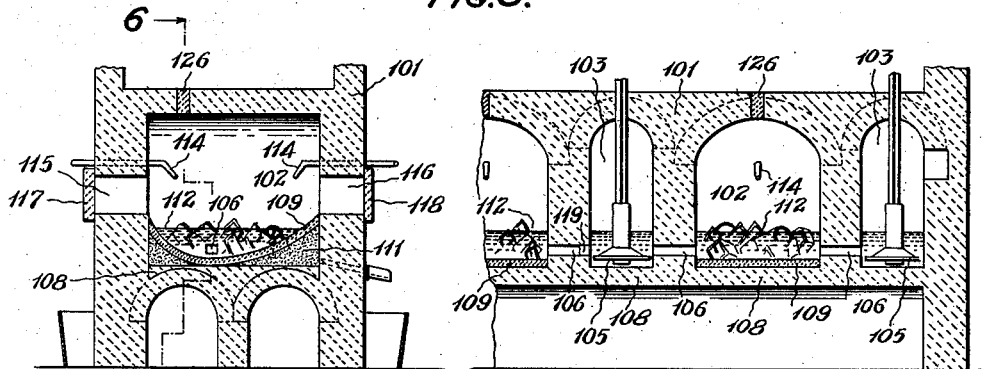
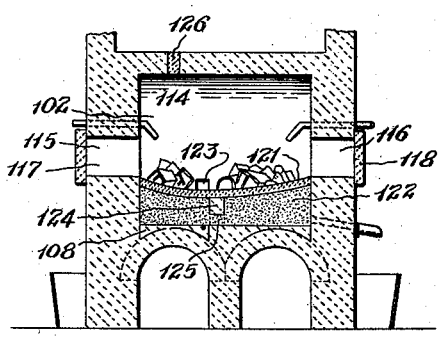
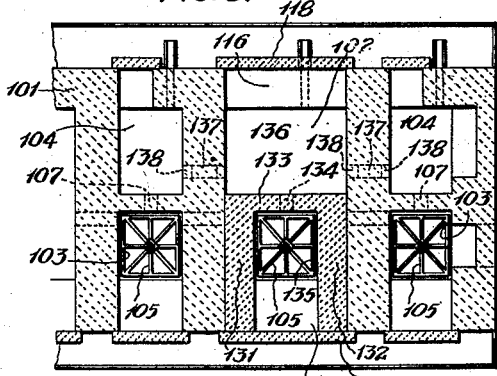
Inventor
John Schmeller, Sr.,
By Saywell & Wessler,
Attorneys Patented Jan. 3, 1939

2,142,875

UNITED STATES PATENT OFFICE 2,142,875

METHOD OF HANDLING AND TREATING METAL

John Schmeller, Sr., Lakewood, Ohio

Original application August 31, 1932, Serial No. 631,280. Divided and this application March 23, 1936, Serial No. 70,227

4 Claims. (Cl. 75—63)

This invention, as indicated, relates to a method of handling and treating metal, especially scrap metal, and is a division of my application Serial No. 631,280, filed August 31, 1932, which has since matured into U. S. Patent No. 2,035,282, granted March 24, 1936. More particularly, it comprises a method of handling metal masses which may be carried out in a furnace especially adapted for the refinement of highly oxidizable metals of low melting point, such as aluminum and its alloys, although certain features of the invention are of general application. It also includes the method of handling metal in various ways by providing a furnace of general utility with means for converting the same into a furnace particularly adapted for handling scrap material of large size, or the providing of a furnace originally constructed for melting larger size scrap sections with means for converting the same into a furnace of general utility and adapted for handling finely divided material, such as borings, turnings, skimmings, and the like. It also includes the method of positioning the various metal masses with reference to each other in accordance with the material used, and the method of bringing various metal masses together in a finished product free of impurities.

The principal object of the present invention is to provide a method of handling metal masses which may be carried out in a furnace having one or more metal treating chambers and metal supplying chambers, whereby the metal to be treated may be converted from a solid to a liquid mass and flowed from the metal supply chamber as a liquid into the metal treating chamber, leaving the residue of impurities including fragments of iron, brass, and the like, as well as foreign particles, as a residue within the melting chamber from which the same may be easily removed from time to time to prevent alloying thereof with the low melting point of the material being treated.

Another object of the invention is to provide a method of handling metal masses which may be carried out in a furnace having a plurality of chambers, one of which may be converted into either a metal treating chamber or a metal melting and supplying chamber, whereby the furnace may be used for a variety of types of metal stock, and converted from one type of operation to another in accordance with the market prices of the raw material. Thus, where aluminum scrap in the form of fragments of castings and the like may be puchased at a price rendering the same available for general foundry use as compared with the cost of borings, turnings, skimmings, and the like, and with their added cost of treatment, it is found desirable to carry on furnace operations with the higher grade material; whereas, under other market conditions, large size scrap is in demand for casting operations of a special character and its price has far exceeded the cost of lower grade material with an added cost of treatment, it is desirable to have a furnace structure adapted for the treatment of such lower grade material. Thus a convertible furnace adapted for several types of raw material will be found of much advantage in maintaining low production costs.

Another object of the invention is the provision of a method of handling metal masses which may be carried out in a furnace structure wherein the heat is most advantageously conserved and distributed and economy of operation is attained through minimum handling of the material and protection against oxidation and heat losses.

Other and further objects of the invention will appear in the course of the following desription.

The annexed drawings and the following description set forth in detail certain means and methods embodying my invention, such means and methods constituting, however, but several of the various forms in which the principle of my invention may be illustrated.

In said annexed drawings:

Figure 3 is a vertical transverse sectional view, taken along the line 3—3, shown in Figure 1, looking in the direction of the arrows;

Figure 4 is a vertical transverse sectional view, taken along the line 4—4, shown in Figure 1, looking in the direction of the arrows;

Figure 5 is a plan view, partly in section, showing a modified type of furnace embodying the principles of my invention;

Figure 6 is a longitudinal sectional view of the structure shown in Figure 5, taken along the line 6—6, looking in the direction of the arrows;

Figure 7 is a transverse vertical sectional view of the structure shown in Figure 5, taken along the line 7—7, looking in the direction of the arrows;

Figure 8 is a view similar to Figure 7, showing a modified form of bottom construction for the melting chamber; and Figure 9 is a fragmentary plan view similar to Figure 5, showing the method of converting the melting chamber of the structure shown in Figure 5 into a unit having a standard metal treating chamber.

Figures 1, 2:
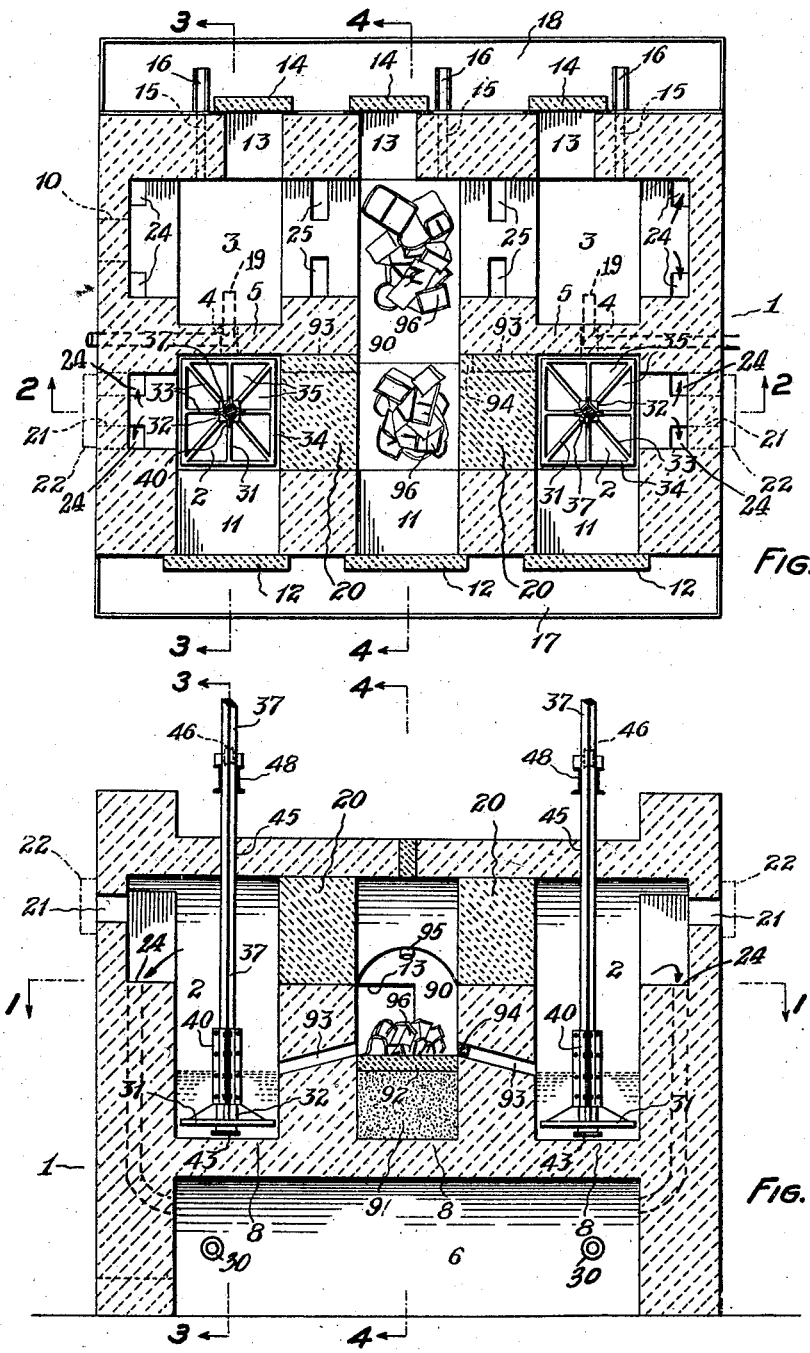
Figure 1 is a plan view, partly in section, of a furnace structure embodying the principles of the invention, taken along the line 1—1, shown in Figure 2, looking in the direction of the arrows.
Figure 2 is a vertical longitudinal sectional view, taken along the line 2—2, shown in Figure 1, looking in the direction of the arrows.

The furnace construction disclosed in the drawings is built along the general lines of the furnace shown in my patent No. 1,659,445, granted February 14, 1928, wherein apparatus for melting and puddling metal such as aluminum and aluminum alloys is disclosed. Said furnace, as has been indicated, is particularly adapted for treating material in the form of finely divided metal particles intermixed with foreign matter and is also adapted for the handling of scrap in various sizes which may be placed directly into the mass of molten metal for melting preliminary to the puddling operation.

As is shown in the drawings, the furnace 1 comprises a brick structure formed of piers and arches and providing for each furnace unit two closed furnace chambers 2, 3, separated by a heavy brick wall and communicating with each other through a small conduit 4 adjacent the floor of said chambers. The reservoir sections of said furnace unit are shown as of substantially equal size although the proportions may be varied in accordance with special requirements or with the character of the stock and the rate of use of the product or other conditions. At a point above the level of the molten metal in said chambers, charging and skimming doors are provided.

While a single furnace unit might be provided, it has been found more economical to construct three or more furnace units in series in a single structure, as shown, which may be simultaneously operated by a crew of workmen more economically than a single furnace unit or a series of independent furnaces. Likewise the operating mechanism for a series of furnace units may be more economically installed and the heat losses may be proportionately reduced. In the drawings, therefore, I have illustrated three furnace units in series. These units, as has been indicated, with the dividing walls in place and before the conversion of the central chamber into a melting chamber, as will be hereinafter described, are intended to operate on material which may carry finely divided particles which could not be satisfactorily handled in view of the high oxidation of such matter in a furnace of other construction or in the converted chamber above referred to. The units are each operatively distinct from the others and a different alloy may be run in each chamber before conversion as hereinafter described.

The structure shown in Figures 1 to 4 inclusive illustrates a furnace converted from a general utility furnace into a scrap-melting furnace. In said furnace, each of the metal treating units is divided centrally by a partition wall 5 so as to provide on one side a combined charging and agitating chamber 2 through which the metal stock is fed into the furnace and on the opposite side with a heating chamber 3 for the reception and temperature control of the casting supply of molten metal.

The dividing wall 5 preferably extends from the ground to the roof of the furnace in each of the series of metal treating units. Beneath each of the series of chambers 2, 3, and also the converted central chamber, arched heating chambers 6, 7, extend. The floors 8, 9, of the communicating chambers 2, 3, rest upon these arches and are packed with ganister or other heat resisting material, and the walls of said chambers are formed of or lined with fire-brick. Where a series of three furnace units is provided for a general utility furnace, it is found to be more economical of fuel to have the division walls between the several charging sections and likewise the walls between the several casting sections extend only to a point slightly above the side doors so that the gases in the upper part of the furnace on the respective sides of the dividing wall 5 may travel freely into any one of the three adjacent charging chambers or the three adjacent casting chambers, but when the furnace is provided with an intermediate scrap melting section, the walls of the charging sections are preferably closed to the top of the structure, and as will hereinafter appear, the casting chambers may also be separated from the scrap melting section. Centrally of the outer wall of each of the charging chambers a charging opening 11 adapted to be closed by a sliding charging door 12 formed of fire-brick, is provided.

Centrally of the outer wall of each of the series of chambers on the casting side of the furnace, an opening 13 is provided adapted to be closed by a sliding fire-brick door 14. Within the upper open portion of the series of chambers, on the casting side of the furnace, fuel supply nozzles 19 are provided through which atomized crude oil or some such fuel mixture may be projected into said chambers. Counterweights (not shown) may be individually applied to each of the doors of the several chambers so that the same may be readily lifted and lowered when the furnace is in operation. In addition to the fuel supply charged directly above the metal reservoirs and melting chamber, provision is made for the heating of each of said series of furnaces by means of nozzles 30 within one end of the arched chambers 6 and 7 heretofore described. An opening 10 is provided at the end of the chamber 7 to permit egress of excess hot gases at that end of the furnace, and this lower opening also constitutes a safety overflow in the event of a leak in the metal reservoirs.

On the discharge or casting side of the furnace, a tap hole 15 and spout 16 are provided adjacent the central lower portion of each of the metal reservoirs. Along each lateral side of the furnace, tanks or troughs 17, 18, adapted to be filled with water are provided into which hot skimmings from the top surface of the molten metal may be dropped as the occasion arises. The depositing of the skimming in the troughs separates the aluminum from the dirt and the aluminum may be again used as part of a charge for the furnace.

At each end of the charging side of the series of furnace units adjacent the top arch an opening 21 is provided, over which a door 22 lined with fire-brick is hung, and through which the furnace gases carrying light dust and dirt and the burning particles of grease and oil, which may be mingled therewith, partially escape. These doors also serve as safety or "explosion" doors and prevent undue pressure within the furnace.

It will be noted that above the surface of the molten mass of metal the furnace carries a heavy bank of hot gases which are sufficient in quantity to completely fill the space referred to, and that such gases are at a slightly higher pressure than the outside atmosphere and constantly seek a passageway through the end openings on the charging side of the furnace heretofore described. Thus when metal stock is charged through any of the several openings into the charging chambers, but little air enters at such points because of the higher pressure of the gases within the furnace which seek egress at such time. Each of the end and internal walls of both the charging and casting chambers is provided with a flue 24, 25, respectively, through which the gases of combustion may pass in part, thus maintaining the temperature of the furnace walls at the desired point. The flues on the casting side are ordinarily left open, but the flues on the charging side are kept closed by covers, inasmuch as the lower heating chamber 6 is only intended for emergency use, at times when the furnace charge might freeze and require a high degree of heat to remelt.

The means for agitating the molten mass of metal in the charging units of the furnace will now be described and while a particular embodiment of such apparatus is illustrated, it is to be understood that other mechanism for accomplishing the same result may be employed instead of that illustrated. Within each of the charging chambers a grid or stirring member 31 is provided which is of an outline similar to that of the furnace chamber and of slightly smaller size than said chamber. Said member comprises a heavy central portion or boss 32, and a series of radial arms 33 gradually decreasing in thickness toward their free ends and joined at such ends by a rim 34 of metal corresponding in outline to the outline of the furnace chamber and spaced from the walls thereof. Between the radiating arms spaces 35 are provided through which the molten metal may freely pass as the grid is plunged downwardly into the molten metal and withdrawn therefrom by the mechanism presently to be described.

Centrally of the grid a beveled socket is provided through which the lower end of the operating stem 37 of the agitating device may be received. The operating stem or rod 37 is preferably of square cross section and is set with one edge toward the front so as to permit two faces of the rod to be scraped free to oxide from the opening at the front of the furnace and the other two faces to be likewise cleaned through access thereto from the opposite side of the furnace. The lower end of the stirring rod or operating member, as is more particularly described in my Patent No. 1,659,445 above referred to, is provided with notches to receive projections upon a series of shoes which have beveled sides terminating in outwardly extending flanges 43. In order to engage the grids with the operating rods, the lower ends of said rods are inserted through the central apertures of said grids and the shoes or tapered plates are engaged with said rods and the grid lowered on the outer beveled surfaces of said plates. The beveled surfaces on the grid aperture and on the outer side of the respective plates coact to insure a firm engagement of the grid with the rod. The rod may be supplied in two sections which are joined to each other in a spliced joint providing a pair of shoulders and overlapping extensions of half the rod size which are firmly bolted together. A boot 40 packed with fire clay and strapped about each rod above the grid prevents the burning out of the rod as it is plunged into the molten mass of metal.

Each of the rods is engaged through an aperture 45 in the roof of the charging units of the furnace so as to reciprocate therein with a minimum loss of heating gases therethrough. Above the furnace said rods are each adapted to reciprocate between two pairs of rollers 46, 49, firmly mounted upon a supporting frame 48 so as to maintain said rod in constant alignment with the aperture through said furnace roof. These rollers are preferably flanged rollers engaging in pairs on opposite sides of the square operating rod and suitable lubricating devices for said rollers may be provided. The rod is set angularly, as heretofore stated, to provide for easy removal of oxide and refuse or skimming.

The upper end of the rod is provided with an aperture 51 for attaching a lifting cable 52. Adjacent the upper end of the rod an extension arm 53 is provided to which a grid depressing cable 54 is secured. The respective cables are passed about pulleys 55, 56, secured to fixed supports above the rod and adjacent the roof of the furnace respectively and thence passed in opposite directions to a pair of sheave wheels 57, 58, mounted upon a shaft 59 preferably located on a platform 61 above the level of the furnace roof. The shaft carrying the respective pairs of sheave wheels is oscillated by suitable mechanism shown in this instance as an electric motor 62 coupled with a suitable reducing gear 63 to means for applying the power to the oscillating shaft so as to rotate the same through approximately 90° of a complete rotation in each direction. Suitable clutch members are provided so the sheave wheels may be connected or released from the oscillating shaft so as to control the operation of the grid members. Suitable counterweights 72 for the grids are provided together with buffering springs 74 and 78, with suitable connecting and guiding cables and rods. Mechanism is also provided in the form of an adjusting pulley 81 and its supporting mechanism and an adjusting rod 84 to adjust the extent to which the grid will move downwardly into the molten metal bath or the point of clearance above said bath to which it will rise within the furnace chamber.

The operative mechanism briefly referred to above is described in full detail in my Patent No. 1,659,445. In said patent there is also described the method of operation of the apparatus in the usual course of puddling metal to free the same from oxides and to incorporate the finely divided particles with the molten metal bath of the furnace chambers.

The present invention, as stated, has in view the conversion of the furnace illustrated in said patent, particularly in Figure 3 thereof, by converting the central puddling and casting chambers into a scrap melting chamber, whereby scrap may be melted as a substantially continuous process or in such quantities and at such times as may be desired, and the melted metal diverted into puddling baths of the furnace at either side of said melting chamber. To this end, the puddling chamber and casting chamber in the center of each side of the furnace illustrated in Figure 3 of said patent are converted into a single melting chamber 90 by closing the opening in the upper part of the walls adjacent the puddling chambers by means of temporary filling walls 20, and by breaking through all or a portion of the dividing wall 5 intermediate the central chambers, and thereafter filling the base of said chambers with a bed of sand 91 or any other suitable heat resistant material and placing over the top of said material a layer 92 of refractory material comprising preferably a fire clay mixture. The level of the floor of the melting chamber may be at a position above the liquid level of the metal bath, or somewhat below said level. In the latter event, the removal of unmelted residue must be constantly in mind to prevent alloying of iron particles with the aluminum bath.

The melting chamber, as shown more particularly in Figures 1 and 4, extends completely through the furnace structure, the floor of said chamber being at each outer end at the level of the respective door openings in the furnace walls on either side and being inclined downwardly with a slight slope toward the position of the discharge conduits or passageways 93 extending through the walls separating the end compartments from the central compartment. The molten metal will also flow through the openings from a perfectly level floor, but in such event the floor must be slightly below the level of the respective door openings in the furnace wall on either side to prevent metal flow through such openings. These discharge conduits are adapted to be closed with fire clay plugs 94 when it is desired to cut off the flow of metal into the adjacent puddling chamber, or such conduits may be kept continuously open so that the metal as melted may flow freely into one or both of the chambers according to the requirements of the work in progress.

When the furnace is converted as indicated, it may be desirable to plug the aperture in the roof of the furnace structure through which the operating rod for a grid would ordinarily extend when the furnace was used in its unconverted condition for the handling of material in which finely divided particles might be present.

Any suitable means may be provided for directly heating and melting the scrap, the jets 95 for gas or other heating medium may be provided above the central melting chamber to more quickly bring about the melting of scrap metal placed within said chamber.

With the apparatus converted into a furnace having multiple units wherein one of said units is particularly adapted for the melting of scrap in the form of relatively large sections 96, placed on the floor of the melting chamber, the rate of operation of the two puddling chambers at either side of the melting chamber is greatly accelerated. Thus, there is no time lost through the stopping of the grid reciprocation while larger particles are melted in the puddling bath. Metals of high melting point, such as iron particles, brass and the like, as well as foreign particles and grit may be left on the floor of the melting chamber and will not flow into the puddling chamber with the pure aluminum or aluminum alloy which is melted in the central chamber. When the upper portions of the walls between the melting chamber and casting chambers are not filled in, hot gases in the casting chambers may freely enter the melting chamber through the open upper portions of this structure and thus this combined bank of reducing gases from the fuel burned under conditions of incomplete combustion in each of these communicating chambers will be maintained above the molten metal in the melting chamber and prevent oxidation thereof. The additional heat supplied by the burners in the melting chamber will also serve to maintain and conserve the heat in the casting chambers as well as in the general furnace structure.

The furnace construction, in place of involving the conversion of a general utility furnace into one particularly adapted for the handling of relatively large size scrap material, may be built in the first instance more particularly for the handling of scrap and may be convertible from such type of furnace, if desired, into a general utility furnace adapted for handling finely divided material, as well as other material. Thus, in the structure shown in Figures 5 to 7 inclusive, the furnace is constructed with one or more melting compartments at an intermediate position adapted to receive scrap and feed the same into one or more adjacent metal treating compartments. The furnace 101, shown in Figure 5, illustrates three melting compartments 102, each adapted to feed melted material into a metal treating compartment at either side thereof. The metal treating compartment is preferably subdivided into a puddling chamber 103 and a casting chamber 104. An agitator grid 105 is preferably positioned within each metal treating or puddling chamber, such structure being along the lines heretofore described and set forth in detail in my patent heretofore referred to, No. 1,659,445.

The metal treating chambers are preferably constructed with walls completely separating them from the adjacent chambers throughout their extent, excepting for the conduits 106 through which the molten metal may flow from the melting chamber into the puddling chamber. The puddling chamber communicates with the casting chamber through a conduit 107 at the base thereof, but is otherwise completely separated from the casting section of the metal treating unit.

The metal treating chamber is preferably constructed with a permanent floor 108 on the level of the adjacent metal treating units, but when used in the form of a furnace for treating scrap of larger proportions, is provided with a concave floor 109 of refractory material, such as ganister and fire clay, superimposed upon a bed of sand 111, or the like.

In the form more particularly shown in Figures 6 and 7, this floor of the melting chamber extends below the normal liquid level 112 within the furnace units and is curved transversely to provide a concave upper surface, the lowest point of which is preferably slightly below the conduit 106 into the adjacent metal treating chamber. Suitable nozzles 114 are provided above the surface of the liquid level to permit oil, gas, or other heating medium to be forced into the interior of the furnace to cause the melting of the material placed therein. When the melting chamber is partially filled with molten metal, the melting of the scrap placed therein will be accelerated due to contact of hot metal with lower portions of the sections of scrap placed in said chamber, and as metal is drawn from the casting chamber in the metal treating unit, the newly melted metal in the melting chamber will flow into the adjacent agitating chamber through the conduit 106. Scrap may be placed in the melting chamber through the door 115 at the agitating side of the chamber, or through the door 116 at the casting side of the chamber, and from time to time the residue of unmelted material accumulating on the floor of the melting chamber may be scraped upwardly along the sloping floor at the bottom of said chamber and discharged outside of the furnace through such openings. Suitable closures in the form of hanging doors 117, 118, formed of fire-brick or other suitable material may be placed over the openings in the melting chamber when no operations in charging the furnace or removing residue therefrom are in progress.

The melting chamber in the construction shown in Figures 5 and 6 more particularly, is shown as of approximately twice the width of the metal treating chambers and this is intended to provide an adequate supply of metal for a metal treating chamber at either side of the melting chamber, so that in an emergency only one melting chamber of a multi-unit furnace such as is shown in Figure 5 may be used to supply two adjacent metal treating chambers, the remaining portion of the furnace being kept idle in the event that the work in hand does not justify utilizing all the facilities of the plant. In such case, where the melting chamber adjacent one end of the structure is continued in operation, the opening 106 into the adjacent melting chamber may be plugged by a clay plug 119 inserted in the conduit leading into the central melting chamber from the metal treating chamber, as is clearly shown in Figure 5. All the remaining features of the furnace construction may follow the general lines described in my patent heretofore referred to.

In place of having the curved floor of the melting chamber extend below the liquid level of the metal bath in the adjacent metal treating chambers, it may be found desirable to maintain said floor above the liquid level in the manner described in connection with the furnace structure first mentioned, but with the wider melting chamber similar to that shown in Figures 5 to 7, inclusive.

Such modified type of melting chamber is shown in Figure 8, wherein the floor 121 is maintained above the liquid level, the base of the furnace being filled with sand 122 or like material, and the conduits 123 communicating with the adjacent metal treating units being positioned at substantially the floor level in the melting chamber adjacent the position of the dividing wall between the puddling chamber and the casting chamber of the metal treating unit. When the temporary floor is placed within the wide metal treating chamber 102 of the furnace, as is shown in Figure 8, the dividing wall 124 below the floor of the melting chamber need not be completely removed, and the conduit 125 through said wall between the puddling and casting sides of the chamber may be filled with the same material, such as clay or sand, which fills the remainder of the bottom of the furnace beneath the floor which preferably is formed of ganister or fire clay. In each of the constructions wherein conversion of the melting chamber into a puddling chamber is in contemplation, the aperture at the top of the chamber through which the stem of the agitator grid may be inserted is preferably closed by means of a plug 126 of fire clay or the like.

As shown in Figures 5 to 9, inclusive, the roof structure of each of the furnace units is preferably arched, the curve of the arch extending transversely of the length of each of the individual units, instead of longitudinally of the furnace, to provide a shorter radius for the respective arches and to permit change in the interior of an individual unit.

With a furnace of the character set forth, the puddling and refining of metal may be carried on very advantageously, although other means for carrying on such operations may be employed. The method preferably comprises the steps of mechanically puddling a mass of molten metal, then flowing a part of the mass of metal from the bottom in a narrow stream to provide an adjacent mass of metal for casting purposes, and melting scrap of low melting point at a level above the first mentioned mass of metal, and flowing the metal from said scrap into said first mentioned mass. The source of metal for the first mentioned mass may comprise finely divided material which may be advantageously fed directly into the mass of molten metal undergoing mechanical puddling. The method also includes the step of puddling and refining metal as above set forth by puddling a mass of molten metal and flowing part of the mass from the bottom in a narrow stream to provide a mass of casting metal, then melting scrap of low melting point at a level above said first mentioned mass of metal, flowing said metal into said first mentioned mass, and removing the residue of unmelted material after said low melting point metal has flowed from said higher level. This method, it will be noted, provides for the stripping of the readily melted aluminum from metal of a higher melting point used for reinforcing purposes and also disposes of the dirt and other foreign matter present as impurities in such castings. The accumulation of material at the higher level may be removed from time to time by means of a scraper and thus the mass of molten metal will be kept at a relatively high degree of purity at all times.

The manner of converting a furnace of the type shown in Figures 5 to 8 inclusive is illustrated in Figure 9, wherein the melting chamber is reduced in size through the building into the interior thereof of lateral temporary wall sections 131, 132, with a temporary dividing wall 133 formed at its base with a conduit 134. The separating wall is so positioned as to provide a puddling chamber 135 of a size to receive a puddling grid 105 with slight clearance about its margins, such grid being supported upon an operating member extending through the roof of the furnace in the manner of the grids in each of the adjacent metal treating chambers. The casting chamber 136 provided in the converted melting chamber, it will be noted by reference to Figure 9, is larger than the casting chambers at either side thereof, but for certain purposes an enlarged casting chamber of this character is of advantage, particularly where a large casting is to be made of metal of a uniform composition and it is desired to insure the metal throughout the structure being of absolutely identical character. Said chamber is also useful in permitting special alloys to be formed by admitting casting metal through conduits 137, at one or both sides of the enlarged casting chamber. Ordinarily said conduits will be closed at each end by plugs 138. The puddling operation in the unit having the enlarged casting chamber may be continued in order that the agitation of the metal bath in said unit may be carried on until substantial homogeneity of the mixture is assured. In this manner the production of specified alloys may be carried through very rapidly and where only small quantities of such alloys are required, a minimum wastage of material will be involved.

As has been indicated, the invention includes the method of positioning various masses of metal on each side of a large casting chamber 136, as shown in Figure 9, and communicating therewith through the conduits 138 controlled by the plugs 137, and the method of bringing such various masses of metal together in a finished product free of impurities. To facilitate the relative positioning of the various metal masses, the convertible type of furnace hereinabove described may be used to great advantage, such furnace permitting the removal of walls and floor levels to change metal masses from one relationship with reference to each other such as large scrap supported on a high level floor to another relationship adapted for material of different character by forming a large casting chamber of lower level to be used to receive molten metal produced from finely divided material. It will be noted that the apparatus described permits the maintaining of one bath of molten metal in fixed position, feeding fine scrap directly to such molten mass, withdrawing from the bottom of said mass metal for casting purposes, and supplying said first mentioned molten mass with metal from a higher level. The method also includes removing a portion of the wall area of the furnace and the floor area at the higher level and installing mechanical puddling means in such chamber so as to provide for a furnace more particularly adapted for fine material in place of a furnace adapted to handle both fine material and large scrap or to advantageously handle large scrap as the principal source of raw material.

Other modes of applying the principle of my invention may be employed instead of those explained, change being made as regards the means and steps herein disclosed, provided those stated by any one of the following claims or their equivalents be employed.

I therefore particularly point out and distinctly claim as my invention:

1. A method of puddling and refining metal which includes the steps of mechanically puddling a mass of molten metal, flowing part of said mass of metal from the bottom in a narrow stream to provide a mass of casting metal, melting finely divided scrap of low melting point at the same level as the first-mentioned mass of metal and in communication therewith, melting large sized scrap of low melting point, intermixed with impurities of high melting point at a level above said first-mentioned mass of metal, and flowing said low melting point metal away from said high melting point impurities and into said first-mentioned mass.

2. A method puddling and refining metal in a convertible furnace which includes the steps of mechanically puddling a mass of molten metal, flowing part of said mass of metal from the bottom in a narrow stream to provide a mass of casting metal, melting large sized scrap of low melting point on a temporarily elevated floor built in a low level chamber at a level above said first-mentioned mass of metal, flowing said metal into said first-mentioned mass, and removing the residue of unmelted material after said low melting point metal has flowed from said higher level.

3. A method of converting a furnace from a furnace for puddling molten metal and receiving finely divided scrap of low melting point at the same level, to a furnace for puddling molten metal and receiving metal from scrap of low melting point intermixed with impurities of high melting point from a level above said first-mentioned level, which includes the steps of changing said furnace to provide a high level support for the miscellaneous scrap and applying temperature conditions to said scrap at said high level to melt the low melting point metal therein and flow said metal into the low level mass in said furnace undergoing puddling, thereafter withdrawing casting metal from the mass of metal undergoing puddling from the bottom of said mass in a narrow stream to provide a mass of casting metal substantially free of oxides and impurities.

4. A method of puddling and refining metal which includes the steps of mechanically puddling a mass of molten metal, flowing part of said mass of metal from the bottom in a narrow stream to provide a mass of casting metal, melting large sized scrap of low melting point, intermixed with impurities of high melting point at a level above said first-mentioned mass of metal, and flowing said low melting point metal away from said high melting point impurities and into said first-mentioned mass.

JOHN SCHMELLER, Sr.